Jan. 30, 1934.  E. PEARSON  1,945,494
SYNCHRONIZER
Filed Nov. 7, 1930   2 Sheets-Sheet 1
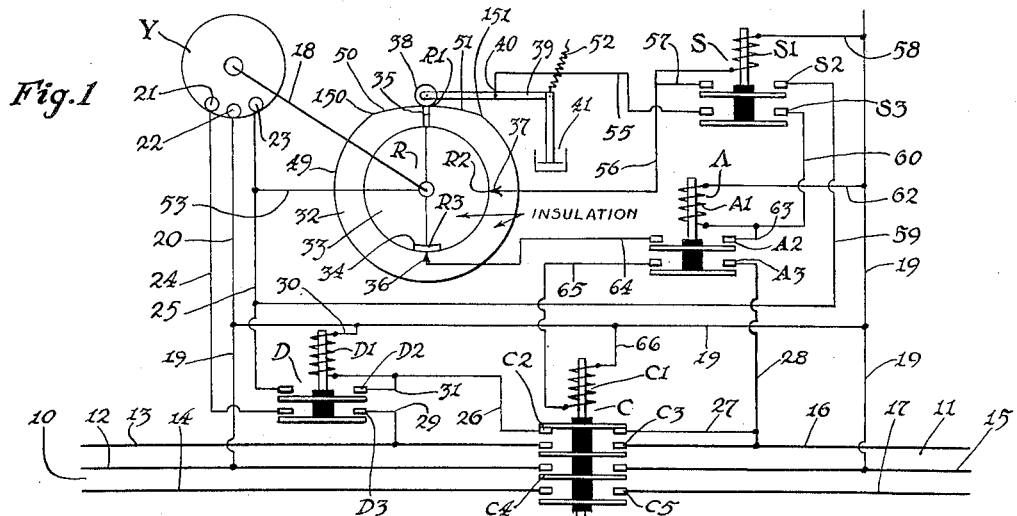
Fig.1
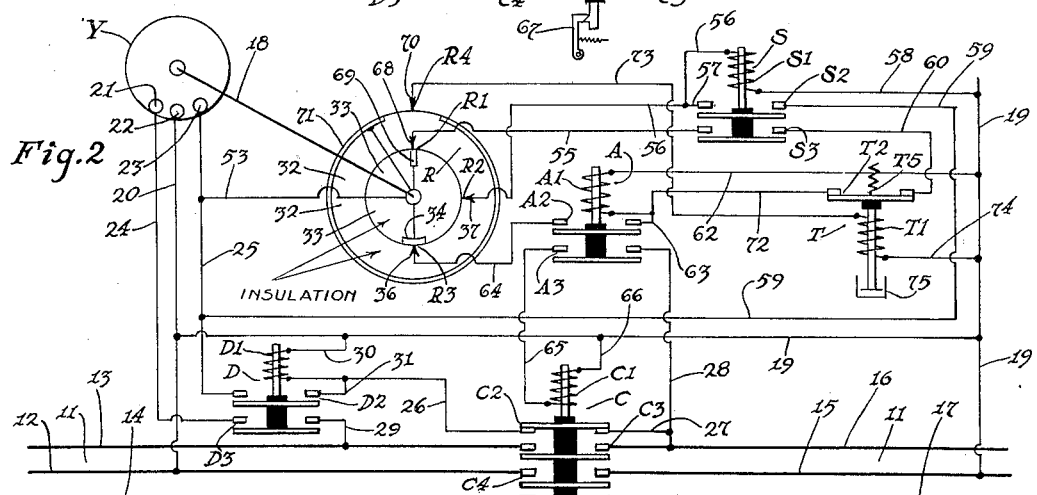
Fig.2
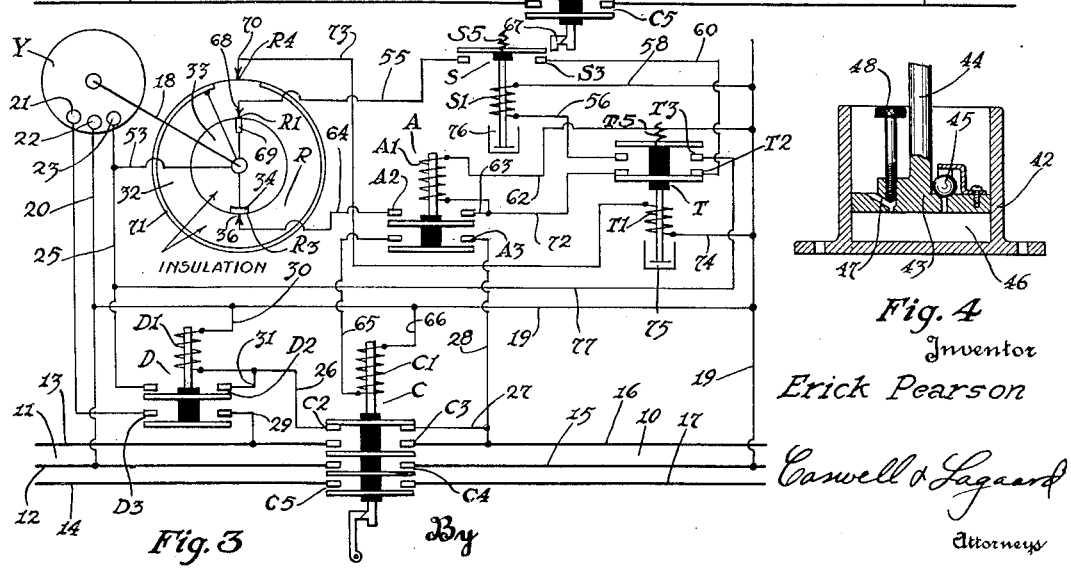
Fig.3
Fig.4
Inventor
Erick Pearson
By Caswell & Lagaard
Attorneys Jan. 30, 1934.　　　　　E. PEARSON　　　　　1,945,494
SYNCHRONIZER
Filed Nov. 7, 1930　　　　2 Sheets-Sheet 2

Inventor
Erick Pearson
By Caswell & Lagaard
Attorneys

Patented Jan. 30, 1934

1,945,494

UNITED STATES PATENT OFFICE 1,945,494

SYNCHRONIZER

Erick Pearson, Minneapolis, Minn.

Application November 7, 1930. Serial No. 493,960

34 Claims. (Cl. 171—118)

My invention relates to synchronizers and has for an object to provide a synchronizer which shall be exceedingly positive in operation and by means of which the generator may be quickly connected to the distribution system.

Another object of the invention resides in providing a synchronizer including a control circuit having a circuit closer therein adapted to be momentarily closed when the generator current and distribution system current are in phase and to further provide mechanically operated timed controlled means for regulating the period of time in which it is permissible to close said circuit to operate the circuit breaker.

A still further object of the invention resides in providing a revoluble member driven by a synchroscope connected to the distribution system and generator, and in providing means on said revoluble member for holding said circuit closer open, said means remaining inactive during a portion of a revolution of said revoluble member.

Another object of the invention resides in providing mechanically operated control means for closing said circuit closer during the period of inaction of the means on said revoluble member.

A feature of the invention resides in providing a safety device for momentarily opening said control circuit in the initial operation of the synchronizer and prior to the opening of said circuit closer.

An object of the invention resides in constructing said safety device with a circuit having a switch adapted to be closed by said revoluble member and including a relay for operating a safety switch in said control circuit.

Another object of the invention resides in employing a normally open switch as said safety switch, adapted to be open when the circuit closer is closed.

A feature of the invention resides in providing a device for limiting the period within which it is permissible to close the circuit breaker after the generator and distribution line have been synchronized.

An object of the invention resides in constructing said device with a circuit having a switch controlled by an auxiliary relay, said auxiliary relay being controlled through the control circuit and operating the circuit breaker, and to further provide means for maintaining said last named circuit closed for a period of time at synchronism just sufficient to permit of closing the circuit breaker.

Another object of the invention resides in operating said switch through said revoluble member and in providing means thereon for maintaining the circuit open for a predetermined portion of a revolution of said revoluble member.

An object of the invention resides in providing a modification of the means for providing mechanical closing of the circuit closer in which a time controlled relay is employed instead of the cams and movable contact member.

Another object of the invention resides in providing a circuit for said relay having a normally closed switch disposed in said control circuit and adapted to be closed for a predetermined length of time at synchronism.

A still further object of the invention resides in providing normally closed switch means on said revoluble member for controlling said timed controlled relay circuit, said switch means opening the circuit at synchronism.

A feature of the invention resides in providing as a modification of the circuit and switch on the revoluble member for operating the safety switch in the control circuit a system whereby such circuit and switch is dispensed with which includes a time controlled relay for operating said safety switch.

Other objects of the invention reside in the novel combination and arrangement of parts and in the details of construction hereinafter illustrated and/or described.

In the drawings:

Fig. 1 is a wiring diagram of a synchronizer illustrating an embodiment of my invention.

Fig. 2 is a wiring diagram of a modification of the synchronizer shown in Fig. 1.

Fig. 3 is a wiring diagram of another form of the invention.

Fig. 4 is a sectional detail view of the timed controlled device utilized with my invention.

Figure 5:
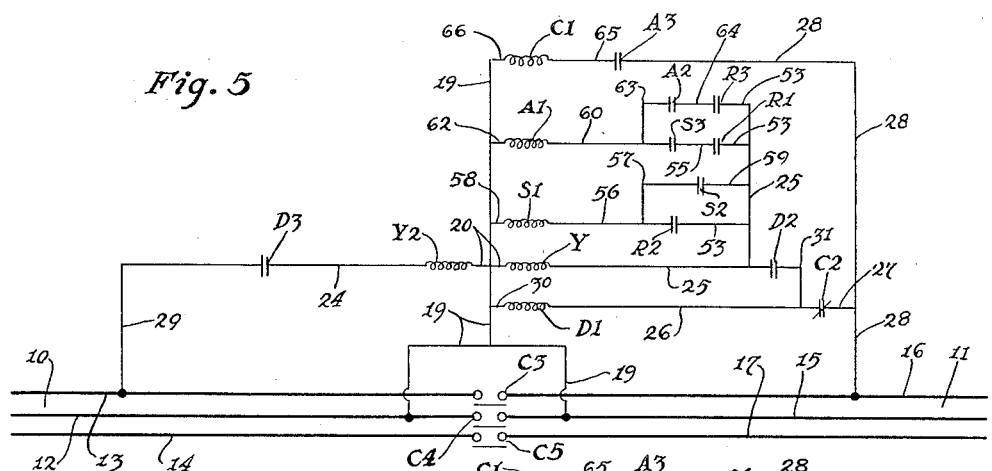
Figure 6:
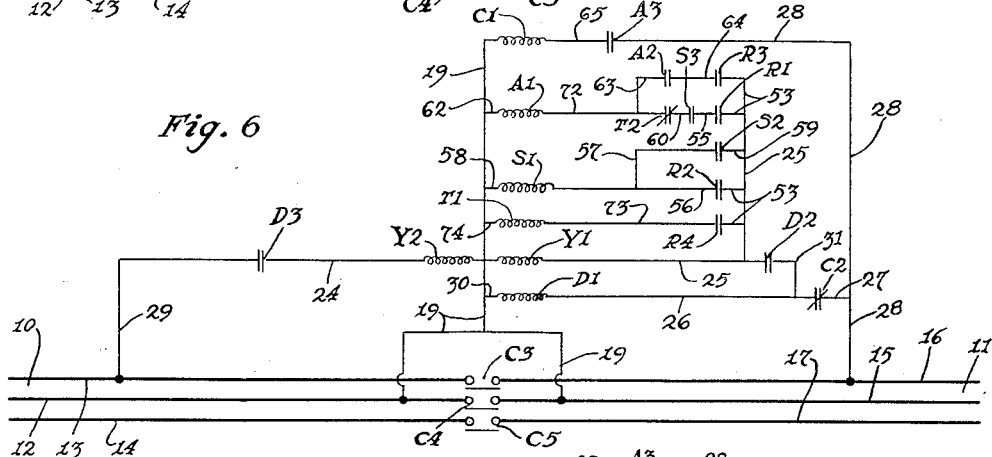
Figure 7:
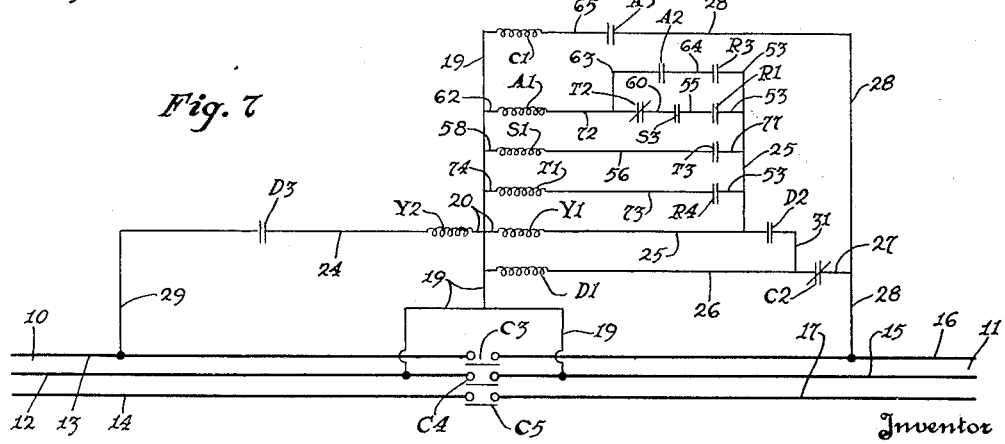

Figs. 5, 6, and 7 are line diagrams of the wiring diagrams shown in Figs. 1, 2 and 3.

My invention is used for connecting an alternating current generator to an alternating current distribution system when the generator current is in synchronism with the distribution system current. For the purpose of illustration the distribution line has been designated at 10 and the generator line at 11. The distribution line comprises conductors 12, 13 and 14, while the generator line 11 similarly comprises conductors 15, 16 and 17. Inasmuch as the power plant construction operating in conjunction with the generator line 11 and the distribution line 10 does not form a particular feature of the invention, the same has not been disclosed in this application, though it can readily be comprehended that any construction such as now well known in the art for this purpose may be employed. For connecting the line 11 to the line 10 a circuit breaker C is employed which is provided with a solenoid C1 and four switches C2, C3, C4 and C5. This circuit breaker is adapted to be closed through the solenoid C1 when the generator is in synchronism with the distribution system as will be presently described in detail.

The synchronizer proper consists of a revoluble member R which is connected through a shaft 18 with a synchroscope Y. This synchroscope may be constructed in the usual manner and is so designed as to rotate at a speed proportional to the differences in frequencies of the two lines to which it is connected and so that the rotor thereof comes to rest at a predetermined position when the two currents are in synchronism. Such synchronizers usually include two windings which have been illustrated in the line diagrams as Y1 and Y2, but which are not shown in the regular wiring diagrams. In the latter only the binding posts 21, 22 and 23 therefor have been shown, the post 22 connecting the two windings together.

The synchroscope Y is wired as follows. Shunting the circuit breaker C is a bus 19 which is connected to the conductor 12 of line 10 and to the conductor 15 of line 11. This bus is further connected through a conductor 20 with the common binding post 22 of the synchroscope Y. The other two binding posts 21 and 23 of this synchroscope are connected through two conductors 24 and 25 to two switches D2 and D3 of a disconnecting relay D. This relay is formed with a solenoid D1 similar to that of the circuit breaker C. The switch D2 of this disconnecting relay is connected through a conductor 31 and a conductor 26 with the switch C2 of the circuit breaker C which in turn is connected through a conductor 27 with a lead 28 from the conductor 16 of the line 11. The switch D3 is connected through a conductor 29 directly to the conductor 13 of line 10. The switch C2 is normally closed when the generator is not in operation and when the circuit breaker C is open so that energy may be taken from the line 11 through the switches D2 and D3 to energize the synchroscope and operate the various devices of the synchronizer when the generator voltage picks up as will be subsequently more fully explained.

For operating the disconnecting relay D a circuit is employed which includes a conductor 30 connected to one side of the solenoid D1 and to the bus 19. The other end of this solenoid is connected to the conductor 26 previously referred to. When the generator voltage comes up to normal current passes through the normally closed switch C2 of circuit breaker C from the conductor 16 of line 11 through conductors 28, 27, 26, solenoid D1, conductor 30 and bus 19 back to the conductor 15 of line 11. In this manner, the disconnecting relay D is energized which closes both of the switches D2 and D3. Upon closure of these switches, current is respectively provided to both sides of the synchroscope Y from the line 11 and from the line 10 causing the same to operate in the usual manner. At the same time current is provided for energizing the other devices of the synchronizer which will now be described in detail.

The revoluble member R may consist of two discs 32 and 33 formed of insulating material. The disc 33 is constructed with a contact 34 while the disc 32 is similarly constructed with a contact 35 both of which rotate with said revoluble member and with the shaft 18 as said shaft is driven through the synchroscope Y. The contact 34 is adapted to be engaged by either of two fixed contacts 36 and 37 which form switches indicated in their entireties by the reference characters R2 and R3. A roller 38 mounted upon a swinging arm 39 engages the contact 35 and provides a switch which I have indicated in its entirety at R1. The arm 39 is pivoted as at 40 to a suitable support and has attached to it a dash pot designated in its entirety at 41 and which is shown in detail in Fig. 4.

The dash pot 41 as best shown in Fig. 4 comprises a cylinder 42 closed at one end and open at the other end. This cylinder is filled with a liquid 46 of suitable viscosity to give the desired time delay brought about by the dash pot. In this cylinder is movable a piston 43 which is connected through a connecting rod 44 with the free end of the arm 39. A leakage port 47 in the piston 43 which can be adjusted through an adjusting screw 48 serves to time the upward movement of said piston and give the desired time delay. A check valve 45 operating in conjunction with the piston 43 permits said piston to travel freely downwardly into the cylinder 42 and retards the movement of said cylinder upwardly through the leakage port 47. The arm 39 is loosely connected to the piston rod 44 so that the piston 43 may control the movement of said arm without binding.

The outer surface of disc 32 is preferably circular throughout the major portion thereof to provide a cam surface indicated at 49. The portion of said disc to which the contact member 35 is attached is, however, cut away to provide two spiraled cam surfaces 50 and 51 intersecting the cam surface 49 at 150 and 151 and leading inwardly to the contact 35. A spring 52 attached to the arm 39 tends to urge the roller 38 radially toward the axis of the disc 32 while the cam surfaces 50 and 51 move said roller outwardly toward the circular cam surface 49 of said disc. Through the action of the dash pot 41, a certain length of time is required in order that the roller 38 travel from the cam surface 50 to the contact 35. If the time required for the disc 32 to travel from the point 150 or 151 to the contact 35 is greater than the closing time for roller 38, said roller will engage contact 35 and close switch R1. If such time, however, is less the roller 38 will not reach the cam surfaces 50 or 51 as the case may be until it has passed contact 35, thereby retaining switch R1 open.

The switches R1, R2 and R3 are all operated in parallel from the conductors 15 and 16 of line 11. Both of the contacts 34 and 35 constituting elements of the switches R1, R2 and R3 are connected through the conductors 53 with the conductor 25 leading to the synchroscope Y, while the other contacts thereof are connected in circuits returning to the bus 19 which will be presently described in detail.

Operating in conjunction with the revoluble member R is a safety relay S which includes a solenoid S1 and two switches S2 and S3. Another conductor 56 connects the contact 37 of switch R2 with one end of the solenoid S1. The other end of this solenoid is connected through a conductor 58 with the bus 19 previously referred to. The switch S2 is connected through a conductor 57 with the conductor 56 and is further connected through a conductor 59 with the conductor 25.

For operating circuit breaker C an auxiliary relay A is provided whereby sufficient current to energize the solenoid C1 may be had. This relay is constructed with a solenoid A1 and with two switches A2 and A3. The switch R1 is connected in a circuit which I have termed a control circuit and which controls the closing of the circuit breaker C. This circuit includes a conductor 55 which is connected to the arm 39 of switch R1 and which is connected to the switch S3 of the safety relay S. The switch S3 is further connected through a conductor 60 with one side of the solenoid A1 of auxiliary relay A. The other side of this solenoid is connected through a conductor 62 which the bus 19. The switch A2 of the auxiliary relay A is connected through a conductor 63 with the conductor 60 and is further connected through a conductor 64 with the switch R3.

The switch A3 of the auxiliary relay A2 serves to operate the circuit breaker C and as previously stated, is connected through the conductor 28 with the conductor 16 of the line 11 while said switch A3 is further connected through a conductor 65 with the solenoid C1 of circuit breaker C. The other side of this solenoid is connected through a conductor 66 with the bus 19.

The operation of the invention is as follows: Assuming that the generator is disconnected and stationary, the various relays and switches would occupy the particular positions shown in Fig. 1. As previously brought out, the switch C2 of the circuit breaker C is normally closed completing a circuit through the conductors 26 and 27 from the conductor 16 of line 11. In the starting of the system, the generator may be started in the customary manner, and as soon as sufficient voltage is developed by the generator, a current flows from the conductor 16 of line 11 through conductor 27 through switch C2 through conductor 26 through solenoid D1 through conductor 30 through the bus 19 and back to the conductor 17 of the generator line 11. This energizes the relay D closing switches D2 and D3. A further circuit may now be traced from the conductor 16 of line 11 through lead 28, conductor 27, switch C2, conductor 26, conductor 31, switch D2, conductor 25, the synchroscope Y, through the conductor 20 and back to the bus 19. In addition another circuit is completed from the conductor 13 of line 10 through conductor 29, switch D3, conductor 24, the synchroscope Y, and back through the conductor 20 to the conductor 12 of line 10. Upon completion of these circuits, the synchronizer is set into operation and the revoluble member R driven from the synchroscope Y.

Prior to the rotation of the revoluble member R, the control circuit is closed through the switch R1. The reason for this is that when synchronism occurs, roller 38 is in engagement with contact 35 and when the generator is cut in the entire synchronizer is de-energized causing the synchroscope drive shaft 18 to stop and to leave the parts in such position. It will, however, be noted that the control circuit is open through the switch S3 at such time so that no current flows through the control circuit thereby preventing the closure of the circuit breaker C, prior to the initial operation of the synchronizer. In addition, it will be noted that the switch R3 is closed but that the circuit through lead 64, etc. connected with this switch is open through the switch A2. As soon as the revoluble member R commences to rotate the contact 37 closes switch R2. This completes a new circuit. Inasmuch as this circuit utilizes part of the synchroscope circuit, this circuit will be traced from the conductor 25 which, as previously described is connected to the conductor 16 of line 11. This circuit may be traced through the conductor 53, switch R2, conductor 56, solenoid S1 of the safety switch S, conductor 58, and bus 19 back to the conductor 15 of line 11. Completion of this circuit energizes safety relay S causing two new circuits to be completed through the switches S2 and S3.

The circuit through the switch S2 is a maintaining circuit holding the switch S3 closed. This circuit shunts the switch R2 and may be traced through the conductor 57 from conductor 56 through switch S2 through conductor 59 back to the conductor 25. The switch S3 is now closed completing the control circuit except through the switch R1.

The switch R1 has a twofold purpose. This switch is adapted first to be closed only when the contact 38 is in the particular position in which the generator current is in phase with the distribution system current. Secondly, the switch R1 requires a certain length of time to close so that unless the revoluble member R is travelling at a predetermined sufficiently low rate of speed, the switch R1 does not close to complete the circuit. In this manner only when the revoluble member R is traveling slowly enough so that the frequencies of the two circuits to be closed are within permissible limits and when the currents are in phase will the switch R1 close to control the operation of the circuit breaker C. In the rotation of the revoluble member R the circular cam surface 49 holds the roller 38 a distance from the axis of the shaft 18 greater than the distance of the contacting surface of the contact 35 from said axis. When the roller 38 comes to the spiralled cam surface 50 or 51 of the revoluble member R, roller 38 through the action of spring 52, is forced axially toward the contact 35. Such movement however, is timed through the dash pot 41 so that a predetermined length of time lapse before the roller 38 has travelled radially the difference between the radius of the cam surface 49 and the radius of the contact 35. Assuming the revoluble member R to be travelling in the direction of the arrow if the speed of said member was sufficiently low, roller 38 would follow cam surface 50 and when said roller engaged contact 35 the controlling circuit would be completed. If, however, the revoluble member was travelling too rapidly, the roller 38 would not have time enough to follow the spiraled cam surface 50 due to the timing of the dash pot 41 and would not again engage the cam disc until the contact 35 had passed said roller. In this manner it becomes impossible to cause the closing of switch R1 until the generator current and the distribution line current are in phase and until the frequencies of the same are within permissible limits.

As soon as switch R1 is closed a circuit may be traced from conductor 25 through conductor 53. switch R1, conductor 55, switch S3, which was previously closed, conductor 60, coil A1 of auxiliary relay A, conductor 62 and back to the bus 19. This energizes the auxiliary relay A closing switches A2 and A3. A maintaining circuit is then completed through switch A2. This circuit commences with the conductor 25 and includes conductor 53, switch R3, conductor 64, switch A2 and conductor 63 which is connected to the conductor 60 shunting both the switches S3 and R1.

The switch A3 controls the circuit for energizing the circuit breaker C. This circuit commences at the line 16 and includes the conductor 28, switch A3, conductor 65, solenoid C1 and conductor 66 which is connected to the bus 19. Upon closure of this circuit, the circuit breaker C is closed closing switches C3, C4 and C5. These switches being connected to the lines 10 and 11 serve to connect the generator to the distribution system. It will be noted that the switch R3 is included in the maintaining circuit for the relay A. The function of this switch is to provide a predetermined length of time in which the circuit breaker C may operate. Should the circuit breaker C fail to operate immediately for any reason and should a surge come in on the line which would throw the generator out of synchronism with the distribution system, the circuit breaker C is prevented from subsequently closing when the currents are out of synchronism thereby safeguarding the apparatus of the system and preventing untimely connection with the generator to the system. The peripheral extent of the contact 34 is great enough to give sufficient time to permit of closing the circuit breaker C under normal conditions and if said circuit breaker does not close, the relay A is de-energized. As soon as the roller 38 leaves the contact 35 the relay S is also de-energized and the operation is repeated. After the circuit breaker C is finally closed to connect the generator to the distribution system, the same may be held in closed position through a latch 67 or other similar construction. This latch may be manually or otherwise controlled so that the same may be released whenever it is desired to shut off the generator.

The switch C2 which was a normally closed switch is opened upon the closing of the circuit breaker C. This switch controls the disconnecting relay D through which energy was had for the synchronizer. When the circuit breaker C is closed, the switch D is opened which de-energizes the entire synchronizer leaving the relays A, D and S all open. Inasmuch as the closure of the circuit breaker C is almost instantaneous and since the speed of the synchronizer at synchronism is very slow the synchronizer almost stops immediately leaving the roller 38 in contact with the contact 35 and the switch R3 closed. It is to prevent the instantaneous closure of the circuit breaker C when the generator is subsequently to be cut in that the relay S is employed which normally maintains the operating circuit open through the switch S3 as previously described. Only after the revoluble member R has rotated a portion of a turn and the switch R2 closed will the control circuit be closed through switch S3 to permit of further closure through the switch R1 when the generator is in synchronism with the distribution system. As soon as the revoluble member R commences to rotate closure of the switch R1 cannot take place until synchronism occurs. In this manner, positive action is procured without danger of the circuit breaker being cut in when the generator and distribution system are not in synchronism.

The form of the invention shown in Fig. 2 differs only from that shown in Fig. 1 in that a different form of timing mechanism is employed instead of the dash pot 41 operating upon the arm 39. In this form of the invention, the switch R1 is not movable and consists of a fixed contact 68 and a revoluble contact 69 fastened on the disc 33 instead of the disc 32. In addition to the switches R1, R2 and R3 another switch R4 is employed which consists of a fixed contact 70 and a contact 71 formed on the disc 32. The contact 71 extends almost entirely about the periphery of the disc 32 so that the switch R4 is closed throughout the major portion of the revolution of the shaft 18. In this form of the invention another relay T is employed through which the timing is procured whereby closing of the circuit breaker is affected only when the revoluble member R travels sufficiently slow and the frequencies of the current of the generator and line are within permissible limits. This relay is provided with a single normally closed switch T2 and with a solenoid T1. A spring T5 normally holds the switch T2 closed. A dash pot 75 similar to the dash pot 41 controls the opening and closing of the switch T2 and is so constructed that the switch T2 opens rapidly and closes only after the lapse of a predetermined length of time. In this form of the invention the control circuit includes the switch T2. Conductor 60, leading from switch S3 is connected to the switch T2 while another conductor 72 is connected from switch T2 to the solenoid A1 of relay A.

The relay T is controlled through a circuit containing switch R4. A conductor 73 connects contact 70 of switch R4 with one end of the solenoid T1, the other end of said solenoid being connected through a conductor 74 to the bus 19.

The operation of the form of the invention shown in Fig. 2 is as follows: Before the synchronizer is operated and the shaft 18 commences to rotate the control circuit though closed through switch R1 is open through switch S3 the same as in the other form of the invention. Also the circuit operating relay S is open through switch R2. Again the circuit controlling relay A is open through switch S3 and the circuit controlling relay T is open through switch R4. It will hence become evident that all of these relays are de-energized and no current flows through any of the circuits connected therewith. Assuming the generator to be up to voltage, the circuit breaker C open and the disconnecting switch D closed, the shaft 18 will be driven through the synchroscope Y and the conductor 25 will be live through the disconnecting relay D. As soon as the shaft 18 commences to rotate, switches R1 and R3 are opened. Shortly thereafter contact 70 engages contact 71 and the switch R4 is closed. This energizes relay T the current flowing from the conductor 25 through conductor 53 through switch R4 through conductor 73 through solenoid T1 through conductor 74 and back to the bus 19. Upon completion of this circuit, the switch T2 is instantly opened and so maintained. This opens the control circuit through switch T2. As soon as the contact 70 leaves the contact 71 the relay T is deenergized permitting the switch T to close in opposition to the action of the dash pot 75. If the revoluble member R is travelling too fast the contact 68 passes the contact 69 before the switch T2 is closed so that the control circuit is thereby maintained open first through switch T2 and then through switch R1. If, however, the revoluble member R is travelling sufficiently slow, the switch T2 may be closed before contact 68 reaches contact 69. Such condition occurs when the frequencies of the current of the generator line and distribution line are within permissible limits to permit of the closing of the circuit breaker. The control circuit is then closed through both switches R1 and T2. Current then flows from conductor 25 through conductor 53, switch R1, conductor 57, switch S3, conductor 60, switch T2, conductor 72, solenoid A1, and conductor 62 back to the bus 19. The relay A is now energized and the maintaining circuit through switch A2 and switch R3 closed as previously brought out. If the circuit breaker is able to close within the time limit afforded by the switch R3, the generator is connected to the line, otherwise relay A is de-energized and the control circuit again opened. When all of the conditions requisite for proper closing of the circuit breaker simultaneously occur, the said circuit breaker may be closed and the generator connected to the distribution system.

If desired, the circuit controlled through contact R2 may be dispensed with by making relay S a time controlled relay as by equipping the same with a dash pot 76 similar to the dash pot 75 or 41, and by providing the relay T with another switch T3. In such case a spring S5 would be employed to normally hold switch S3 open. The conductor 56 of solenoid S1 instead of being connected to the switch R2 of revoluble member R is connected to the switch T3 and the other side of this switch is connected through a lead 77 to the conductor 25. When the solenoid S1 is so connected the maintaining circuit therefore may be dispensed with and the switch S2 of relay S also dispensed with. The dash pot 76 may be similar to the dash pots 75 or 41 and constructed in a manner to permit of rapidly closing the switch S3 and slowly opening the same. The timing of the dash pot 76 is such that the switch S3 remains closed a greater length of time than the switch T2.

The operation of the form of the invention shown in Fig. 3 is as follows. When the parts are in normal position, the circuit through switch R4 is opened through said switch and the circuit through switch R1 is opened through switch S3 while the circuit through switch R3 is opened through switch A2. All of the circuits of the synchronizer are hence de-energized. Assuming that the circuit breaker C is open and that the disconnecting relay D is closed, the synchroscope Y is energized. As soon as the shaft 18 commences to rotate the revoluble member R is turned and the contact 71 caused to engage the contact 70 closing switch R4. Closure of this switch completes a circuit from conductor 25 through conductor 53 through switch R4 through conductor 73 through solenoid T1 through conductor 74 and back to the bus 19. Relay T is then immediately operated causing the instantaneous closing of the switch T3 and the opening of the switch T2. The relay T remains in such position until the contact 71 leaves the contact 70 opening switch R4. The switches T3 and T2 are then permitted through the dash pot 75 to return to normal position upon the lapse of a predetermined length of time. If the revoluble member R is travelling too rapidly the contact R4 is closed before the switches T2 and T3 reach their normal position thereby causing the solenoid T1 to be again energized and the switch elements retained in actuated positions. Upon closure of switch T3 a circuit is completed from conductor 25 through conductor 77 through switch T3 through conductor 56 through solenoid S1 and conductor 58 back to the bus 19 thereby energizing the solenoid S1 and closing the switch S3. The control circuit is now closed excepting through the switch R1 and the switch T2. If the revoluble member R is now travelling sufficiently slow to permit the switch T2 to close prior to the contact 69 reaching the contact 68 the control circuit will then be completed when the switch R1 is closed. The circuit may then be traced from conductor 25 through conductor 53 through switch R1 through conductor 57 through switch S3 through conductor 60 through switch T2 through conductor 72 through solenoid A1 and through conductor 62 back to the bus 19. Relay A is now operated and the circuit breaker C closed as previously described cutting in the generator and disconnecting the entire synchronizing mechanism.

The advantages of my invention are manifest. The synchronizer is extremely positive in action. The operation of the synchronizer is independent of the voltage of either the generator or distribution system so that the timing procured is exactly the same at all times and under all conditions. By means of the safety circuit employed, the entire synchronizer may be completely disconnected after synchronism and again connected while the synchronizing contacts are in their original positions. By means of the switch in the maintaining circuit for the auxiliary relay controlled by the revoluble member, closing of the circuit breaker must be accomplished within a permissible time limit or otherwise the generator remains disconnected, so that in case the circuit breaker is not operating properly and a surge comes in the line, the circuit breaker is not closed at an inopportune time. In this manner further safety is procured.

Changes in the specific form of my invention as herein described may be made within the scope of what is claimed without departing from the spirit of the invention.

Having described my invention what I claim as new and desire to protect by Letters Patent is:—

1. A synchronizer comprising a control circuit, a support, a member revoluble relative to said support, contact means revoluble with said revoluble member, a contact on said support adapted to engage said revoluble contact means, said contacts forming a circuit closer in said control circuit, a synchronizing device for rotating said revoluble member, the contact on said support being movable out of the path of movement of said revoluble contact, means on said revoluble member for moving the contact on said support out of the path of movement of said revoluble contact, and time controlled means for moving the contact on said support back into the path of movement of said revoluble contact.

2. A synchronizer comprising a control circuit, a support, a member revoluble relative to said support, a contact revoluble with said revoluble member, a contact on said support adapted to engage said revoluble contact, said contacts forming a circuit closer in said circuit, a synchronizing device for rotating said revoluble member, said second named contact being movable out of the path of movement of said revoluble contact, a cam on said revoluble member for moving said second named contact out of the path of movement of said revoluble contact, and time controlled means for moving said contact on said support back into the path of movement of said revoluble contact.

3. A synchronizer comprising a control circuit, a support, a member revoluble relative to said support, a contact revoluble with said revoluble member, a contact on said support adapted to engage said revoluble contact, said contacts forming a circuit closer in said circuit, a synchronizing device for rotating said revoluble member, said second named contact being movable out of the path of movement of said revoluble contact, a cam means on said revoluble member adapted to move said second named contact out of the path of movement of said revoluble contact upon rotation of said revoluble member in one direction, and other cam means on said revoluble member for moving said second named contact out of the path of movement of said revoluble contact upon rotation of said revoluble member in the other direction.

4. A synchronizer comprising a normally open control circuit having a circuit closer therein, means for closing said circuit closer substantially at synchronism, a switch in said circuit, a second circuit, a circuit closer in said second circuit, means movable at a rate dependent upon differences in frequencies for opening said second named circuit closer for a length of time dependent upon the rate of movement of said movable means, and a retarded solenoid in said second named circuit adapted to close the switch in said control circuit upon the opening of said second named circuit, through said second named circuit closer, a length of time greater than that required by said solenoid to bring said switch into closed position, a safety switch in said control circuit time controlled means for holding said safety switch open for a length of time greater than that required by said retarded solenoid to return said first named switch to closing position.

5. A synchronizer comprising a normally open control circuit having a circuit closer therein, means for closing said circuit closer substantially at synchronism, a switch in said circuit, a second circuit, a circuit closer in said second circuit, means movable at a rate dependent upon differences in frequencies for opening said second named circuit closer for a length of time dependent upon the rate of movement of said movable means, and means controlled by said second named circuit and rendered operable to close said switch upon opening of said second named circuit.

6. A synchronizer comprising a control circuit, a revoluble member, a synchroscope for rotating said revoluble member, a circuit closer in said circuit, means operated by said revoluble member for opening said circuit closer, said means ceasing to act on said circuit closer for a portion of a revolution of said revoluble member, and time controlled means for closing said circuit closer during the period of inaction of said circuit closer opening means.

7. A synchronizer comprising a control circuit, a revoluble member, a circuit closer in said control circuit controlled by said revoluble member, a synchronizing device for rotating said revoluble member, a normally open safety switch in said circuit, a solenoid for operating said safety switch including a second circuit, another normally open switch in said second circuit, a second solenoid for operating said other switch, a normally closed switch in said control circuit operated by said second solenoid, means for timing the return movement of said second named solenoid to cause said normally open switch to remain closed a predetermined length of time, means for timing said first named solenoid to cause said safety switch to remain closed for a predetermined length of time, a circuit for operating said second named solenoid, and a switch on said revoluble member in said last named circuit for opening said circuit during a portion of a revolution of said revoluble member substantially at synchronism.

8. In an electrical system wherein two sources of alternating current are to be synchronized, a circuit breaker for connecting said sources together, a synchronizing device having a movable member, a control circuit for operating said circuit breaker, a switch in said circuit, a timing device for controlling the operation of said switch, actuating means constantly acting on said timing device and tending to cause the operation thereof, restraining means operated by said movable member for restraining the operation of said actuating means during the major portion of the cycle of movement of said movable member, said restraining means releasing control of said actuating means for a portion of the cycle of movement of said movable element at synchronism.

9. In an electrical system wherein two sources of alternating current are to be synchronized, a circuit breaker for connecting said sources together, a synchronizing device having a movable member, a control circuit for operating said circuit breaker, a safety switch in said control circuit and switch operating means actuated by said movable member solely at a predetermined non-synchronous position of said movable member for operating said safety switch.

10. In an electrical system wherein two sources of electrical current are to be synchronized, a circuit breaker for connecting said sources together, a synchronizing device having a movable member, a control circuit, means operated by said movable member for rendering said control circuit operable when the two sources of alternating current are substantially in synchronism, an auxiliary relay momentarily actuated by said control circuit substantially at synchronism for closing said circuit breaker, a maintaining circuit for maintaining said auxiliary relay in operation, a switch in said circuit operated by said auxiliary relay and switch means in said maintaining circuit operated within predetermined limits of phase relation substantially at synchronism.

11. In an electrical system wherein two sources of electrical current are to be synchronized, a circuit breaker for connecting said sources together, a synchronizing device having a revoluble member, said revoluble member having a cylindrical surface with a flat spot, a control circuit for operating said circuit breaker, switch means in said circuit including a member adapted to engage the cylindrical surface and flat spot of said revoluble member, said switch being adapted to be operated when in engagement with the flat spot on said revoluble member, resilient means for urging said switch member into engagement with the flat spot of said revoluble member, and a timing device for controlling the rate of movement of said switch member toward said flat spot.

12. In an electrical system wherein two sources of alternating current are to be synchronized, a circuit breaker for connecting said sources together, a synchronizing device having a movable member, a control circuit for operating said circuit breaker, a switch in said control circuit adapted to be operated by said movable member and adapted to be operated when said sources are substantially in synchronism and a second switch in said control circuit operated by said movable member and adapted to be operated after said movable member has moved out of synchronous position.

13. In an electrical system wherein two sources of alternating current are to be synchronized, a circuit breaker for connecting said sources together, a synchronizing device having a movable member, a control circuit having a switch adapted to be operated by said movable member at its synchronous position and means dependent upon movement of said movable member out of said synchronous position to prevent closing of the circuit breaker prior to the initial movement of said synchronizing device.

14. In an electrical system wherein two sources of electrical current are to be synchronized, a circuit breaker for connecting said sources together, a synchronizing device having a revoluble member, a control circuit, a switch in said control circuit adapted to be operated by said revoluble member, an auxiliary relay actuated by said control circuit and including a switch, a circuit including said switch for operating said circuit breaker, a maintaining circuit for maintaining said auxiliary relay operative, and a switch operated by said revoluble member for closing said maintaining circuit.

15. In an electrical system wherein two sources of electrical current are to be synchronized, a circuit breaker for connecting said sources together, a synchronizing device having a revoluble member, a control circuit, a switch in said control circuit adapted to be operated by said revoluble member, an auxiliary relay actuated by said control circuit and including a switch, a circuit including said switch for operating said circuit breaker, a maintaining circuit for maintaining said auxiliary relay operative, a peripherally extending contact on said revoluble member, a fixed contact cooperating therewith, said contacts forming a switch disposed in said maintaining circuit.

16. In an electrical system wherein two sources of alternating current are to be synchronized, a circuit breaker for connecting said sources together, a synchronizing device having a revoluble member, a control circuit for operating said circuit breaker, a switch in said control circuit adapted to be operated by said revoluble member when in its synchronous position, a safety switch in said control circuit, a solenoid for operating said safety switch, a circuit for operating said solenoid, and a switch in said last named circuit, said switch being operated by said revoluble member upon movement of said member out of its synchronous position.

17. In an electrical system wherein two sources of alternating current are to be synchronized, a circuit breaker for connecting said sources together, a synchronizing device having a revoluble member, a control circuit for operating said circuit breaker, a switch in said control circuit adapted to be operated by said revoluble member when in its synchronous position, a safety switch in said control circuit, a solenoid for operating said safety switch, a circuit for operating said solenoid, and a switch in said last named circuit, said switch being operated by said revoluble member upon movement of said member out of its synchronous position, and a maintaining circuit closed by said solenoid for maintaining said solenoid operative upon initial operation thereof through said revoluble member.

18. In an electrical system wherein two sources of electrical current are to be synchronized, a circuit breaker for connecting said sources together, a synchronizing device having a revoluble member, said revoluble member having a cylindrical surface and a surface deviating from the cylindrical surface, a control circuit for operating said circuit breaker, switch means in said circuit including a member adapted to engage both the cylindrical surface and the deviating surface of said revoluble member, said switch means being adapted to be operated after passing said cylindrical surface, resilient means for urging said switch member into engagement with said deviating surfaces and a timing device for controlling the rate of movement of said switch member toward said deviating surface.

19. In an electrical system wherein two sources of electrical current are to be synchronized, a circuit breaker for connecting said sources together, a synchronizing device having a revoluble member, said revoluble member having a surface containing a circle concentric with the axis of said revoluble member, and a surface deviating therefrom, a control circuit for operating said circuit breaker, switch means in said circuit including a member adapted to engage both the first named surface and the deviating surface of said revoluble member, said switch being adapted to be operated after leaving said first named surface, resilient means for urging said switch member into engagement with said deviating surface and a timing device for controlling the rate of movement of said switch member toward said deviating surface.

20. In an electrical system wherein two sources of alternating current are to be synchronized, a circuit breaker for connecting said sources together, a synchronizing device having a movable member, a control circuit for operating said circuit breaker, a switch in said circuit, a timing device for controlling the operation of said switch, actuating means constantly acting on said timing device and tending to cause the operation thereof, restraining means operated by said movable member for restraining the operation of said actuating means during the major portion of the cycle of movement of said movable member, said restraining means releasing control of said movable element at synchronism, and means for momentarily rendering said control circuit inoperative during initial movement of said movable member.

21. In an electrical system wherein two sources of alternating current are to be synchronized, a circuit breaker for connecting said sources together, a synchronizing device having a movable member, a control circuit for operating said circuit breaker, switch means operated by said movable member and adapted to actuate said control circuit at synchronism, a safety switch in said control circuit normally rendering said control circuit inoperative and so functioning when the movable member is at synchronous position and means operated by said movable member for procuring reverse operation of said safety switch upon a given movement of said movable member and maintaining such operation throughout the subsequent operation of said movable member.

22. In an electrical system wherein two sources of alternating current are to be synchronized, a circuit breaker for connecting said sources together, a synchronizing device having a movable member, a control circuit for operating said circuit breaker, switch means operated by said movable member and adapted to actuate said control circuit at synchronism, a safety switch in said control circuit normally rendering said control circuit inoperative and so functioning when the movable member is at synchronous position and a switch operated by said movable member at a predetermined position of said movable member other than the synchronous position thereof for procuring reverse operation of said safety switch.

23. In an electrical system wherein two sources of alternating current are to be synchronized, a circuit breaker for connecting said sources together, an auxiliary switch for operating said circuit breaker, a synchronizing device having two switches, means for initiating the operation of said auxiliary switch to close the circuit breaker, said means including one of said synchronizing switches, the other of said switches maintaining said means operative during a predetermined phase angle at synchronism after actuation of said means for initiation of the auxiliary switch.

24. In an electrical system wherein two sources of alternating current are to be synchronized, a circuit breaker for connecting said sources together, a circuit for operating said circuit breaker including an auxiliary relay, a synchronizing device having two switches, a circuit for operating said auxiliary relay, one of said switches being connected in said circuit and initiating operation of said circuit breaker substantially at synchronism, a maintaining circuit for said auxiliary relay, said second synchronizer switch being in said maintaining circuit and operating to maintain the circuit breaker closing circuit operative during a predetermined phase angle at synchronism, and an auxiliary switch in said maintaining circuit operated by said auxiliary relay.

25. In an electrical system wherein two sources of alternating current are to be synchronized, a circuit breaker for connecting said sources together, a synchronizing device having two switches, means for operating said circuit breaker, one of said switches actuating said means for a predetermined phase angle at synchronism and the other of said switches being included in a circuit normally inoperative and rendered operative by said first named switch to maintain actuation of said means.

26. In an electrical system wherein two sources of alternating current are to be synchronized, a circuit breaker for connecting said sources together, a synchronizing device having two switches, one of said switches initiating actuation of said circuit breaker at a predetermined phase position with respect to synchronism, means for terminating actuation of said circuit breaker at another phase position and including said second switch, said last named means being normally inoperative and being rendered operative by said first named switch.

27. In an electrical system wherein two sources of alternating currents are to be connected, switching means for connecting said sources together, a synchronizing device responsive to the frequency and phase differences of potential of said sources, a contact element, means mechanically operated by said device for intermittently moving said contact element in one direction at time intervals related inversely to the frequency difference, means for returning said contact element during the intervals between the intermittent actuations thereof, a timing element for retarding the return movement of said contact element, a contact engageable by said contact element after a predetermined return movement, the retardation of said movement being correlated to the permissible frequency difference at closing of said switching means so that at any greater frequency difference said contact element is always moved in said one direction before it can engage said contact, and means controlled by the engagement of said contact element and contact for closing said switching means.

28. An electrical system as in claim 27, in which said contact is carried in rotation by said synchronizing device, so that the engagement of said contact element and contact can occur only at substantial phase coincidence.

29. In an electrical system wherein two sources of alternating currents are to be connected, switching means for connecting said sources together, a synchronizing device responsive to the frequency and phase differences of potential of said sources, first control means for actuating said switching means within a small range of phase angle substantially at phase coincidence, second control means for normally preventing said actuation of said first control means, both said control means being operated by said synchronizing device, said second control means being actuated by said device for permitting the actuation of said switching means by said first control means within a predetermined range of phase angle, and a differentially operative timing mechanism included in said second control means for procuring reverse operation of said second control means when the frequency difference between said sources is above a predetermined value.

30. In an electrical system wherein two sources of alternating currents are to be connected, switching means for connecting said sources together, a synchronizing device responsive to the frequency and phase differences of potential of said sources, first control means operated by said device for closing said switching means substantially at phase coincidence, and an independent timing device operated from said synchronizing device and including a pair of relays with differently timed elements for controlling the movement thereof, one of said relays when de-energized operating within a short time to close a circuit included in said first control means, the other said relay when de-energized operating within a longer time to open said included circuit, said one relay also including contacts closed upon energization thereof and connected for energizing said other relay whereby to prevent the closing actuation of said switch means when the frequency difference is greater than a predetermined value.

31. In an electrical system wherein two sources of alternating currents are to be connected, switching means for connecting said sources together, a synchronizing device responsive to the frequency and phase differences of potential of said sources, first control means operated by said device for closing said switching means within a small range of phase angle at substantial phase and frequency coincidence, means for normally preventing said closing actuation, and a second control means for moving said preventing means into position for permitting said actuation, said second control means being operated by said device at an angle of phase difference outside said range.

32. In an electrical system wherein two sources of alternating currents are to be connected, switching means for connecting said sources together, a synchronizing device responsive to the frequency and phase differences of potential of said currents, first control means actuated by said device within a small range of phase angle for initiating the closing of said switching means, second control means operated by said device during a range of phase angle greater than said first range and including said first phase range, said second control means being operatively connected with said first control means for continuing the closing movement of said switching means after said initiation of the closing movement by said first control means, and means for holding said switching means closed after it has reached closed position, said second control means being actuated after said device has moved through said greater range for producing a reverse operation whereby to interrupt the continuance of said closing movement.

34. In an electrical system wherein two sources of alternating currents are to be connected, normally open switching means for connecting said sources together, a synchronizing device responsive to the frequency and phase differences of potential of said currents, first means actuated by said device for initiating the closing of said switching means and operative only during a small range of angles of phase difference, second means actuated by said device during the actuation of said first means for continuing the closing of said switching means after said first means ceases to be operative and for producing a reverse operation and interrupting the continuance of said closing at the end of a time interval inversely proportional to the frequency difference, and means for holding said switching means closed after it has reached closed position.

34. In an electrical system wherein two sources of alternating current are to be connected, normally open switching means for connecting said sources together, a synchronizing device responsive to the frequency and phase difference of the potentials of said currents, actuating means controlled by said device for initiating the closing of said switching means during a small range of angles of phase difference, and means controlled according to the frequency difference for rendering said actuating means operative when the frequency difference is less than a predetermined rate and for quickly procuring a reverse operation thereof when the frequency difference becomes greater than said predetermined rate prior to the initiation of the closing of said switching means.

ERICK PEARSON.